(12) United States Patent
Sawahata et al.

(10) Patent No.: US 8,692,435 B2
(45) Date of Patent: Apr. 8, 2014

(54) ROTATING ELECTRIC MACHINE

(75) Inventors: Masanori Sawahata, Hitachi (JP);
Mamoru Kimura, Hitachinaka (JP);
Satoshi Kikuchi, Tokai (JP); Akiyoshi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/272,247

(22) Filed: Oct. 13, 2011

(65) Prior Publication Data

US 2012/0091850 A1 Apr. 19, 2012

(30) Foreign Application Priority Data

Oct. 14, 2010 (JP) .................................. 2010-231081

(51) Int. Cl.
*H02K 17/16* (2006.01)

(52) U.S. Cl.
USPC ........................................................ 310/211

(58) Field of Classification Search
USPC .................. 310/211, 156.78, 156.81
See application file for complete search history.

(56) References Cited

U.S. PATENT DOCUMENTS

| | | | | |
|---|---|---|---|---|
| 1,597,666 A | * | 8/1926 | Barr ............................... | 310/211 |
| 2,159,695 A | * | 5/1939 | Gorham ......................... | 310/211 |
| 3,260,874 A | * | 7/1966 | Robinson ........................ | 310/64 |
| 4,496,864 A | * | 1/1985 | Apetrei et al. ................... | 310/77 |
| 5,155,404 A | * | 10/1992 | Sadarangani ................... | 310/211 |
| 5,182,483 A | * | 1/1993 | Hibino et al. ................... | 310/211 |
| 7,541,710 B2 | | 6/2009 | Nemoto et al. | |

FOREIGN PATENT DOCUMENTS

| | | |
|---|---|---|
| JP | UM 52-17045 | 4/1977 |
| JP | 54-148207 | 11/1979 |
| JP | 56-053562 | 5/1981 |
| JP | 57-049357 | 3/1982 |
| JP | 57-173361 | 10/1982 |
| JP | 07-163106 | 6/1995 |
| JP | 09-224358 | 8/1997 |
| JP | 10-117467 | 5/1998 |
| JP | 2002-218722 | 8/2002 |
| JP | 2006-230189 | 8/2006 |
| JP | 2008-278642 | 11/2008 |
| JP | 2009-278783 | 11/2009 |
| JP | 2010-178532 | 8/2010 |

OTHER PUBLICATIONS

Corresponding Office Action in Japan Application No. 2010-231081, dated Sep. 17, 21013, with English language translation thereof.

* cited by examiner

*Primary Examiner* — Dang Le

(74) *Attorney, Agent, or Firm* — Antonelli, Terry, Stout & Kraus, LLP.

(57) ABSTRACT

A rotor slot is asymmetrically shaped with respect to a straight line drawn from the central axis of the rotation of the rotor in a radial direction, and has a slot opening, the circumferential width of which is smaller than that of the rotor slot, at the top of the rotor slot, so that a loss generated in the rotor due to a carrier harmonic component can be reduced and the power factor can be improved, enabling a current generated in an armature winding to be suppressed and thereby improving efficiency in a rated operation.

15 Claims, 10 Drawing Sheets

ROTATING ELECTRIC MACHINE

CLAIM OF PRIORITY

The present application claims priority from Japanese Patent application serial No. 2010-231081, filed on Oct. 14, 2010, the content of which is hereby incorporated by reference into this application.

TECHNICAL FIELD

The present invention relates to a rotating electric machine, and more particularly to a rotating electric machine having cage-type secondary windings such as, for example, an induction motor that is driven by an inverter.

BACKGROUND ART

Recently, there has been an increasing demand to save energy of an entire driving system by using an inverter to operate a motor at variable speeds. Although the efficiency of an entire system can be increased in various operation states by driving an induction motor with an inverter, a carrier harmonic component generated by the inverter causes a loss in rated operation, unlike a case in which the system is driven by using commercial power supply. This type of loss may lower the efficiency.

A technology to improve the efficiency of an inverter-driven induction motor is described in Patent Literature 1, in which a bar of a rotor is shaped so that the bar is enlarged toward the outer circumference of the rotor. This enables an increase in secondary resistance due to the enlarged skin effect and thereby reduces the harmonic copper loss of rotor cage. Another technology is described in Patent Literature 2, in which a rotor slot is formed wider than the conventional shape and is disposed near the outer circumference of the rotor while being inclined in a rotational direction with respect to a straight line drawn from the center of the rotor to the outer circumference. In a technology in Patent Literature 3, to improve start characteristics and the efficiency in a rated operation, a rotor conductor has a double-cage shape; where an upper bar is displaced by a predetermined angle in the rotational direction or the direction opposite to the rotational direction.

CITATION LIST

Patent Literature

[Patent Literature 1] Japanese Patent Laid-open No. Sho 54 (1979)-148207
[Patent Literature 2] Japanese Patent Laid-open No. 2002-218722
[Patent Literature 3] Japanese Patent Laid-open No. 2009-278783

SUMMARY OF INVENTION

Technical Problem

When an attempt is made to increase the efficiency of an inverter-driven induction motor by reducing a loss caused in the induction motor, a shape different from a conventional shape is necessary to reduce the loss caused by the carrier harmonic component generated by the inverter.

In the technology described in Patent Literature 1, the opening of the rotor slot is enlarged, so the harmonic component according to the number of slots becomes large, thereby increasing noise, torque pulsation, and a loss in the stator. Another problem is that the enlarged opening of the rotor slot reduces the rotor tooth size, so the effect of magnetic saturation becomes large and an iron loss is increased.

In the technology described in Patent Literature 2, the rotor slot has no opening, so a no-load current is increased as a leakage flux is increased, thereby lowering efficiency. Since the magnetic flux of a high frequency due to the carrier harmonic component generated by the inverter is likely to penetrate a rotor iron core, when the harmonic magnetic flux (the magnetic flux generated by the harmonic component) penetrates the surface of the rotor bar through the rotor iron core, an eddy current is generated on the surface of the rotor bar. This may increase the iron loss and the amount of heat.

A rotor conductor is generally formed by aluminum die-casting. Aluminum has a higher resistivity than copper, which is used as the material of the rotor conductor of an induction motor with an output of several hundreds of kilowatts or more, so much copper loss is generated. This may lower the efficiency in a rated operation.

In the technology described in Patent Literature 3, the copper loss of rotor cage are increased because the material of a conductor disposed on the outer circumference side of the rotor has a high resistance, so the efficiency in a rated operation may be lowered. A conductor, made of a low-resistance material, that is disposed on the inner circumference side of the rotor is more distant from a gap between the stator and the rotor than the conductor on the outer circumference side. Furthermore, there is no opening in the rotor slot. Accordingly, this technology may increase the leakage flux, may lower the efficiency in a rated operation, and may lower a power factor. The lack of an opening in the rotor slot makes it difficult to suppress an eddy current due to the carrier harmonic component. This may increase the iron loss and the amount of heat.

An object of the present invention is to provide a rotating electric machine that can improve the efficiency in a rated operation by reducing a loss generated in a rotor due to a carrier harmonic component during the driving by an inverter and suppressing a current generated in armature windings by improving a power factor.

Solution to Problem

To achieve the above object, the rotating electric machine according to the present invention has rotor slots that are each asymmetrically shaped in the circumferential direction of the rotor with respect to a straight line (an axis of symmetry) drawn from the central axis of the rotation of the rotor in its radial direction and also has a slot opening, the width of which in the circumferential direction is smaller than the width of the rotor slot, at the top of the rotor slot.

Advantageous Effects of Invention

The rotating electric machine according to the present invention can reduce the harmonic copper loss of rotor cage, which are generated according to the carrier harmonic component and the number of stator slots and rotor slots, and can suppress a primary current flowing in the armature windings by increasing the power factor, and thereby improving the efficiency in a rated operation.

DESCRIPTION OF EMBODIMENTS

Embodiments of the rotating electric machine according to the present invention will be described with reference to the drawings.

First Embodiment

Figure 1:
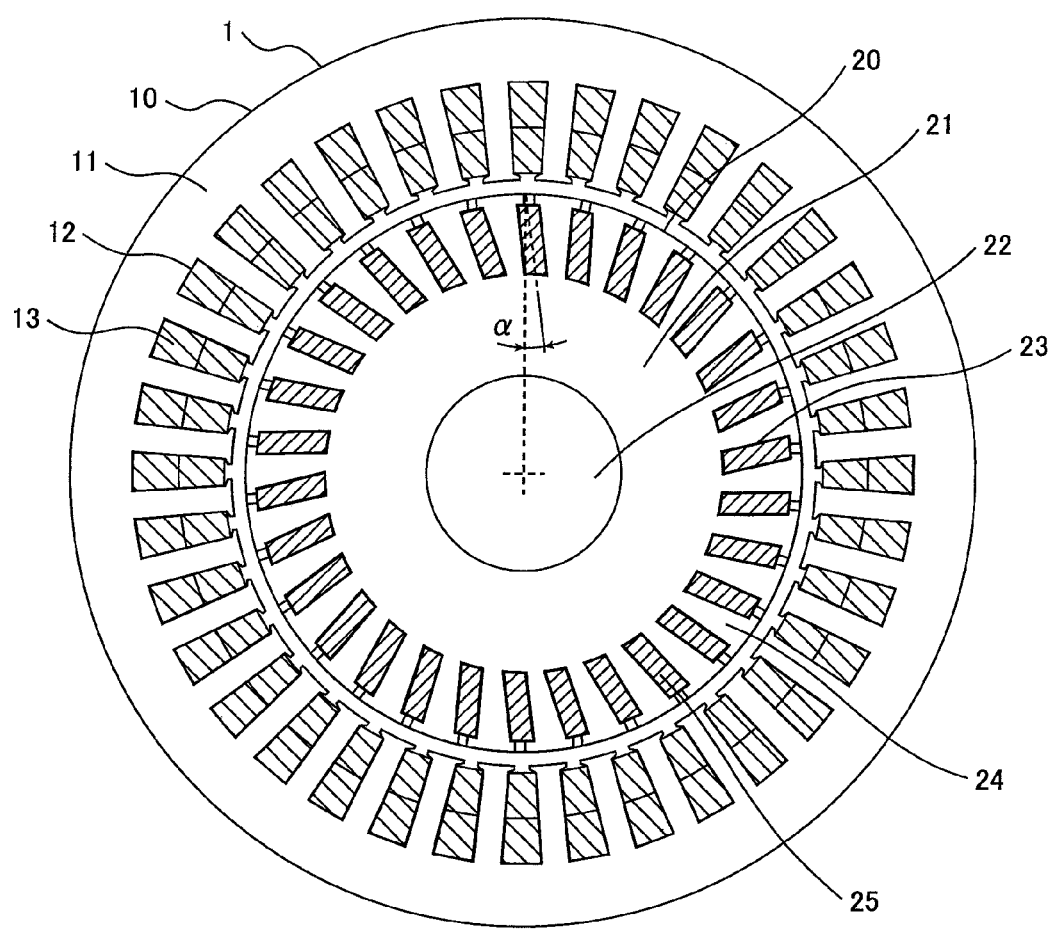
FIG. 1 is a lateral cross sectional view of an induction motor that is an embodiment of a rotating electric machine according to the present invention (first embodiment).
Figure 2:
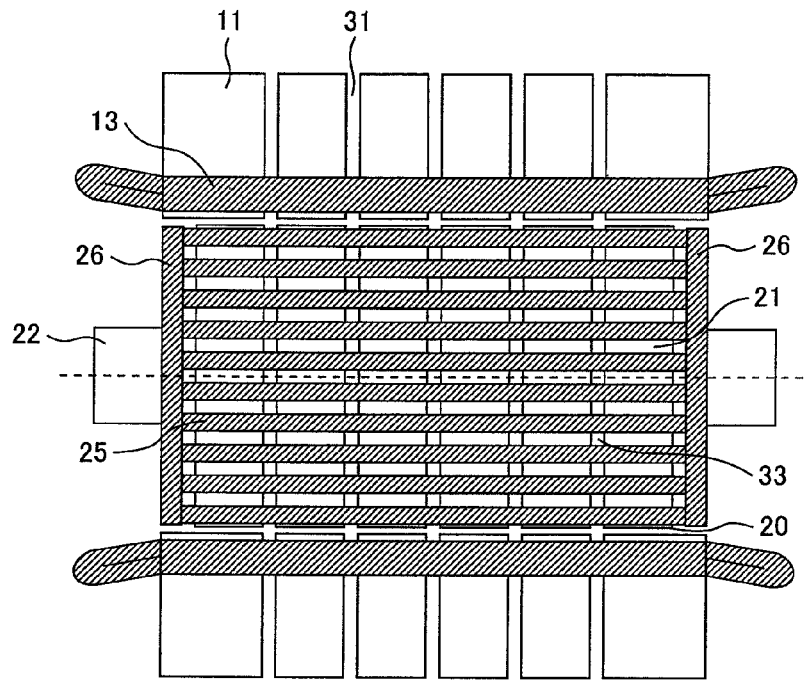
FIG. 2 is a longitudinal cross sectional view of FIG. 1.

FIGS. 1 and 2 show the structure of an induction motor that is a first embodiment of the rotating electric machine according to the present invention. As shown in these drawings, the induction motor 1 is substantially structured with a stator 10, a rotor 20, which is disposed so as to face the stator 10 with a predetermined gap therebetween, and a shaft 22.

The stator 10 includes a stator iron core 11 having a plurality of stator slots 12, which are formed on the inner diameter side of the stator iron core 11, are spaced in the circumferential direction at predetermined intervals, and extend in the axial direction, and an armature winding 13 provided in the stator slots 12. The rotor 20 includes a rotor iron core 21 linked to the shaft 22 and having a plurality of rotor slots 23, which are formed on the outer diameter side of the rotor iron core 21, are spaced in the circumferential direction at predetermined intervals, and extend in the axial direction, and a squirrel cage conductor provided in the rotor slots 23. The squirrel cage conductor includes a plurality of rotor bars 25 and end rings 26. Copper, aluminum, brass, and the like can be used as the material of the squirrel cage conductor. Rotor teeth 24 are formed between the rotor slots 23 in the circumferential direction of the rotor. The rotor bar 25 is inserted into the pertinent rotor slot 23 formed in the rotor iron core 21 in advance from the end in the axial direction of the rotor iron core 21, and is then attached to the end ring 26 by brazing, welding, friction stir welding, or the like. An inverter provided outside the induction motor 1 is connected to the armature winding 13 through a connection wire (not shown).

When a voltage is applied to the armature winding 13 by using commercial power supply, the armature winding 13 generates not only a magnetic flux due to a fundamental current but also a harmonic magnetic flux according to the winding placement and the number of slots. When the harmonic magnetic flux penetrates the rotor bar 25 through the gap between the stator 10 and the rotor 20, the harmonic copper loss of rotor cage occur in the rotor bar 25 and an eddy current loss occurs on the outer circumferential surface of the rotor iron core 21. A hysteresis loss due to the magnetic flux caused by the armature winding 13 occurs in the rotor tooth 24. Magnetic saturation, which becomes a cause of reduction in the power factor, increases an exciting current flowing in the armature winding 13 and causes a problem of vibration and noise from the induction motor 1.

When the induction motor 1 is driven by an inverter, a carrier frequency in the inverter superimposes a frequency much higher than the fundamental frequency on a voltage waveform applied to the induction motor 1. This is a well-known phenomenon.

Accordingly, a current flowing in the armature winding 13 has a distorted waveform on which a harmonic component is superimposed, so not only the magnetic flux due to the fundamental current and the harmonic magnetic flux generated according to the number of slots but also a harmonic magnetic flux due to the carrier frequency of the inverter are generated in the induction motor.

These harmonic fluxes prevent the current flowing in the squirrel cage conductor in the rotor 20 from evenly flowing in the entire rotor bar 25, as in the case of the fundamental frequency component, causing the current to concentrate near the outside in the radial direction of the rotor bar 25 and making the current density distribution uneven in the rotor bar 25. Due to this phenomenon, called the skin effect, the harmonic copper loss of rotor cage becomes larger than in driving on commercial power supply. The harmonic flux that penetrated the rotor iron core 21 generates an eddy current on the surface of the rotor iron core 21, which becomes a factor that increases the eddy current loss of the rotor iron core 21.

Figure 3:
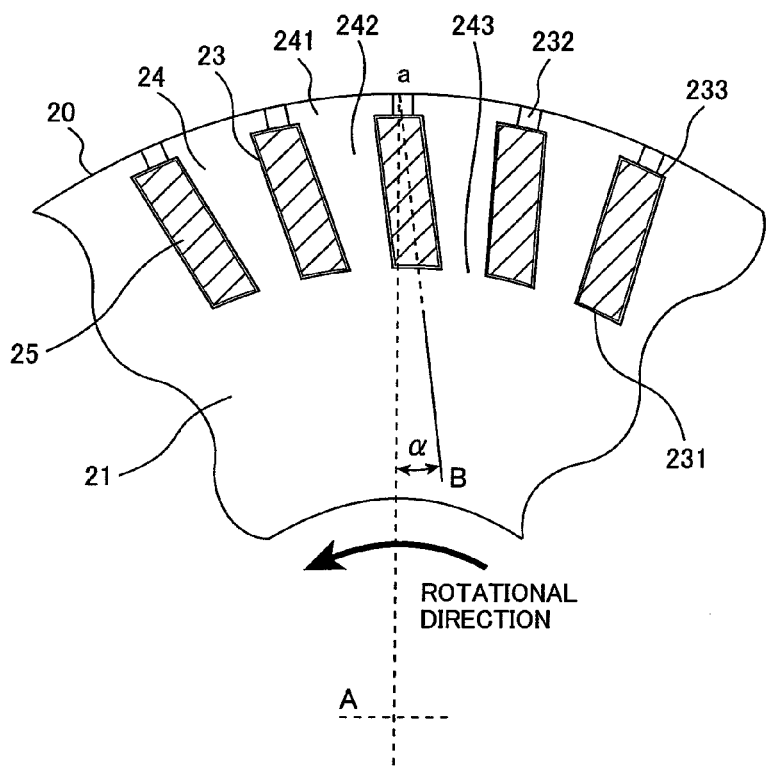
FIG. 3 is a partial cross sectional view of a rotor, illustrating the shapes of the rotor slots of the induction motor in FIG. 1 in detail.

FIG. 3 shows the shape of the rotor of the induction motor in the first embodiment. The reference point "a" is a point at which a straight line passing through the central point of a rotor slot bottom 231 and the central point of a rotor slot top 233 intersects the outer circumference of the rotor 20. With the induction motor in this embodiment, the rotor slot 23 is formed so that the central point of the rotor slot bottom 231 is located behind a straight line A-a in the rotational direction, the straight line A-a being drawn from the center of the rotation of the rotor 20 in the radial direction, and the straight line A-a and a straight line B-a forms a predetermined angle α at the reference point "a" on the outer circumference of the rotor 20, the straight line B-a being drawn from the reference point "a" so as to pass the central point of the rotor slot bottom 231. Furthermore, a rotor slot opening 232, which is half closed (the circumferential width of the rotor slot opening 232 is smaller than that of the rotor slot 23), is formed at the edge of the outer circumference side of the rotor slot 23, and the central point of a rotor slot opening 232 located behind the straight line B-a in the rotational direction. Thus, the rotor slot 23 in this embodiment is asymmetrical (non-axisymmetrical) shaped in the circumferential direction with respect to the straight line A-a (an axis of symmetry) drawn from the center of the rotation of the rotor 20 in the radial direction.

Figure 4:
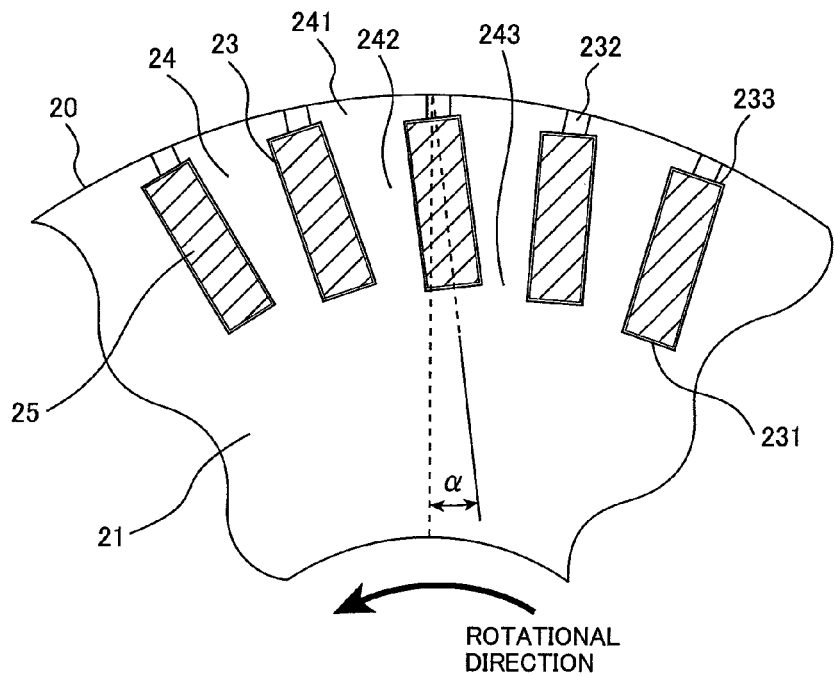
FIG. 4 is a partial cross sectional view of the rotor, illustrating an example of the shapes of the rotor slots in the present invention
Figure 5:
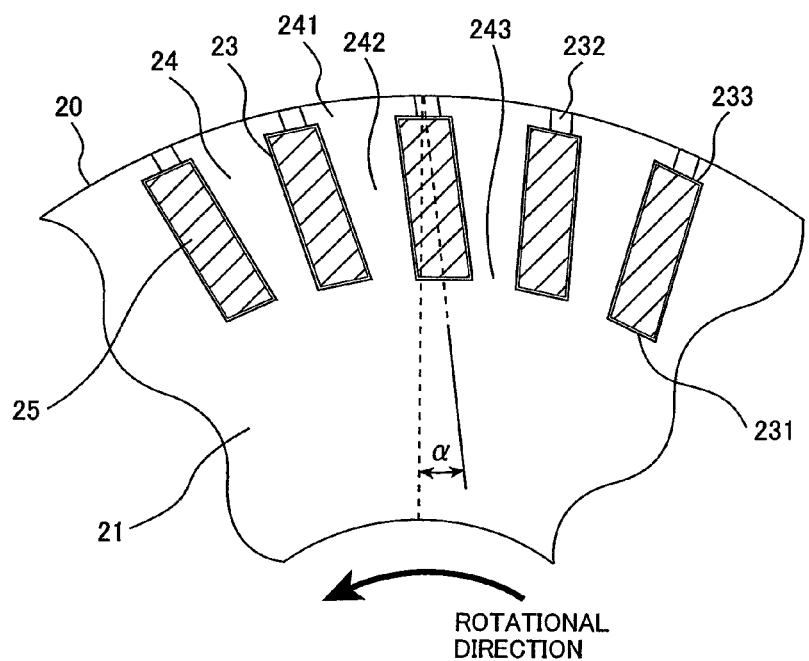
FIG. 5 is a partial cross sectional view of the rotor, illustrating an example of the shapes of rotor slot openings in the present invention.
Figure 6:
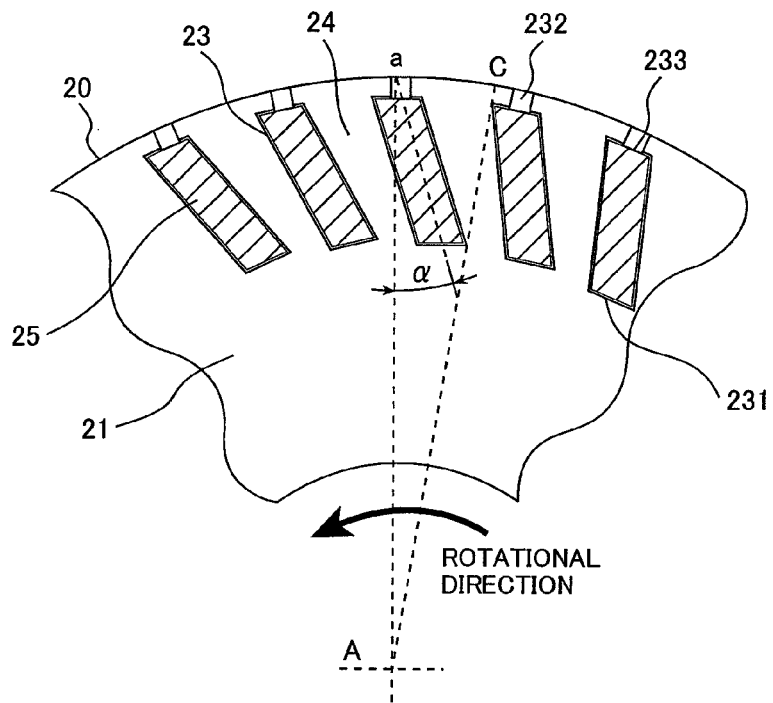
FIG. 6 is a partial cross sectional view of the rotor, illustrating an asymmetrical limit of the rotor slot shape in the present invention.

The rotor slot 23 may be shaped so that its corners are at right angles as shown in FIG. 4 or are chamfered in a round shape (not shown). The rotor slot opening 232 may be formed in any possible shape; for example, its sides in the radial direction are parallel to the sides of the rotor slot 23 in the radial direction as shown in FIG. 5. The angle α formed by the straight lines A-a and B-a can be widened to an extent to which a corner of the rotor slot bottom 231 is not on a straight line A-C connecting the center (A) of the rotation of the rotor 20 and the opposite corner (C) of the adjacent rotor slot top 233, as shown in FIG. 6.

Figure 7:
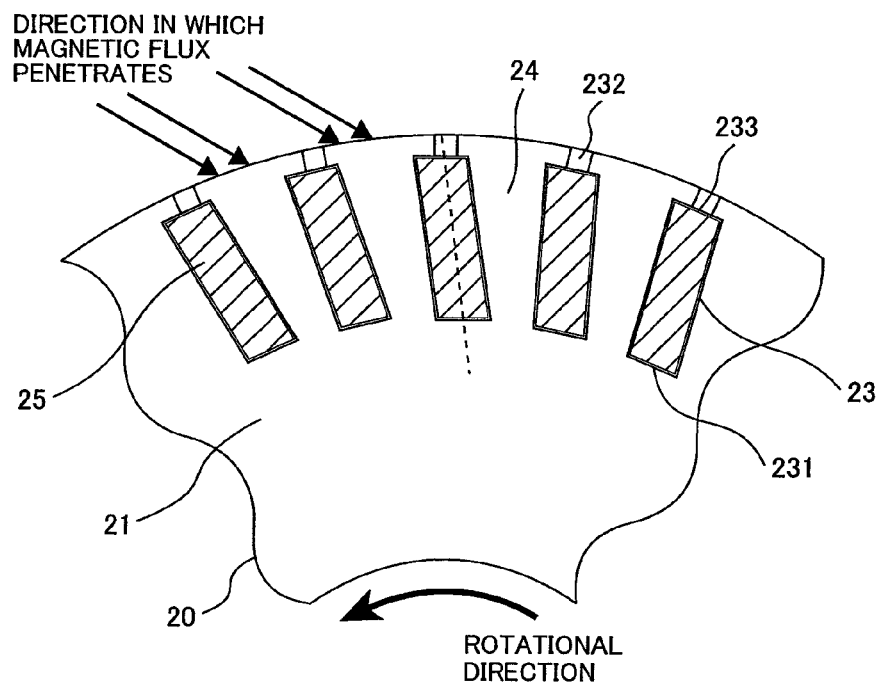
FIG. 7 is a partial cross sectional view of the rotor, illustrating a magnetic flux flow into the rotor of the induction motor, which is an embodiment of the present invention.

The above rotor shape can suppress the harmonic magnetic flux that penetrates the outside in the radial direction of the rotor bar 25 and can thereby suppress the harmonic copper loss of rotor cage. In a rated operation, the magnetic flux generated from the armature winding 13 penetrates at an angle with respect to the rotational direction of the rotor 20, as shown in FIG. 7. Accordingly, the rotor shape in the first embodiment enables the fundamental flux from the armature winding 13 to easily interlink the rotor bar 25.

Accordingly, the power factor of the induction motor 1 is improved, the current flowing in the armature winding 13 is suppressed, and the fundamental primary copper loss is reduced. Since the rotor slot opening 232 is provided, the magnetic flux leaking from the rotor 20 is reduced and the fundamental primary copper loss in the armature winding 13 is reduced.

Since the harmonic magnetic flux, which generates the harmonic copper loss of rotor cage, concentrates on the advancing side (front part) of a rotor tooth top 241 in the rotational direction of the rotor 20, if the rotor slot opening 232 is formed at the back part of the rotor slot top 233 in the rotational direction of the rotor 20, it is possible to suppress the harmonic magnetic flux penetrating the outside of the rotor bar 25 in the radial direction and thereby to reduce the harmonic copper loss of rotor cage.

Additionally, since the magnetic flux from the stator 10 penetrates most the advancing side of a rotor tooth top 241 in the rotational direction of the rotor 20, the magnetic saturation is easy to occur in the front part of a rotor tooth top area in the rotational direction of the rotor 20. Here, the rotor tooth top area includes not only the rotor tooth top 241 but also a rotor tooth part in the vicinity of the rotor tooth top 241 in the depth (radial) direction. If the rotor slot opening 232 is formed at the back part of the rotor slot top 233 in the rotational direction of the rotor 20, the cross sectional area of the rotor tooth top area on the advancing side in the rotational direction is increased. This means that the volume of the iron core in the front part of the rotor tooth top area, which the magnetic flux penetrates most, is increased, the effect of magnetic saturation on the rotor tooth top area is mitigated, so it becomes possible to reduce the hysteresis loss and suppress the generation of the harmonic component due to magnetic saturation, enabling noise and vibration to be suppressed.

Second Embodiment

Figure 8:
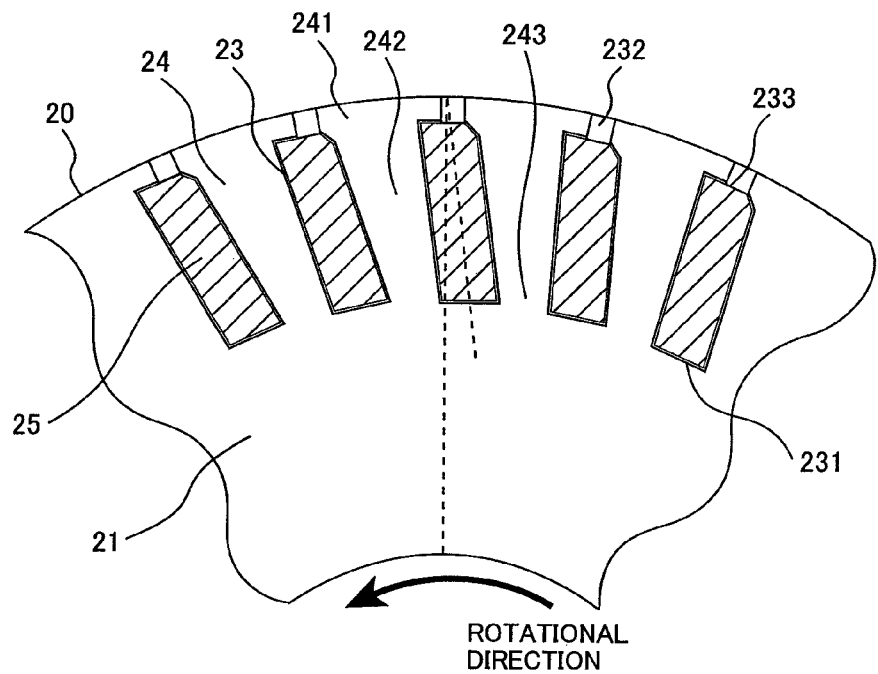
FIG. 8 is a partial cross sectional view of a rotor, illustrating the shapes of the rotor slots of an induction motor that is another embodiment of the rotating electric machine according to the present invention (second embodiment).

FIG. 8 shows the shape of the rotor of an induction motor in a second embodiment. As shown in FIG. 8, this embodiment is characterized in that the back of the rotor slot top 233 in the rotational direction is machined so that the cross sectional area of the rotor tooth top area on the advancing side in the rotational direction becomes larger when compared with the rotor shape in the first embodiment.

Although, in FIG. 8, the rotor slot top 233 is linearly machined at the back in the rotational direction of the rotor 20, it may be chamfered in a round shape, for example. According to the embodiment of FIG. 8, the effect of magnetic saturation can be further reduced besides the advantageous effects in the first embodiment and it becomes possible to reduce the hysteresis loss and suppress the generation of the harmonic component due to magnetic saturation, enabling noise and vibration to be suppressed.

Third Embodiment

Figure 9:
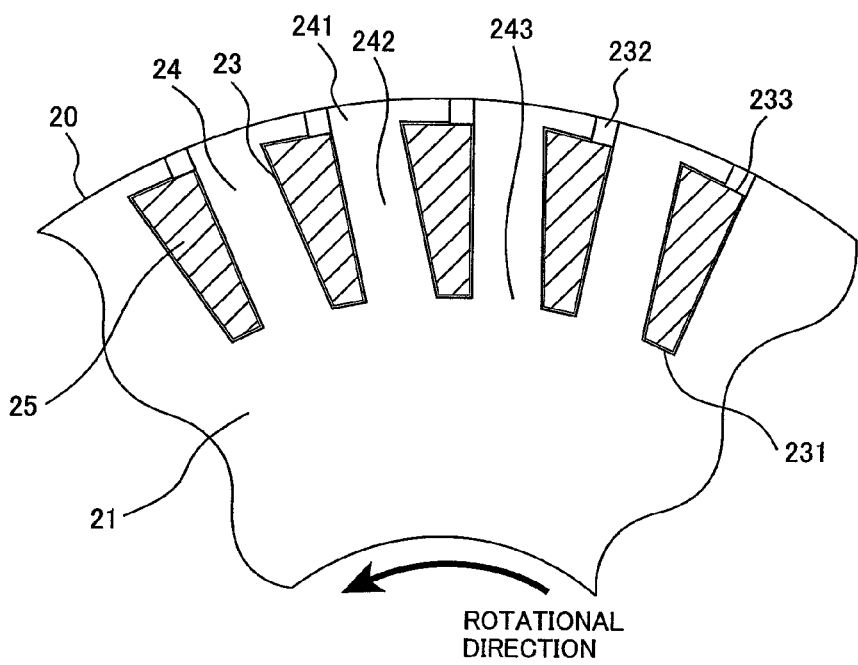
FIG. 9 is a partial cross sectional view of a rotor, illustrating the shapes of the rotor slots of an induction motor that is yet another embodiment of the rotating electric machine according to the present invention (third embodiment).

FIG. 9 shows the shape of the rotor of an induction motor in a third embodiment. As shown in FIG. 9, this embodiment is characterized in that, unlike the rotor shape in the first embodiment, the width of the rotor tooth 24 in the circumferential direction is constant in the radial direction.

Since the width of the rotor tooth 24 in the circumferential direction is constant, the flux density at a rotor tooth central part 242 and a rotor tooth root 243 can be suppressed. Accordingly, the magnetic flux from the armature winding 13 can easily interlink the rotor bar 25 and the fundamental primary copper loss in the armature winding 13 can be reduced.

Furthermore, since, in this embodiment, the surface area of the rotor bar 25 in the radial direction is enlarged, it becomes possible to mitigate the eddy current due to the harmonic magnetic flux generated according to the placement of the armature windings 13 and the number of slots and the harmonic magnetic flux generated according to the carrier frequency of the inverter and thereby to suppress the harmonic copper loss of rotor cage.

Figure 10:
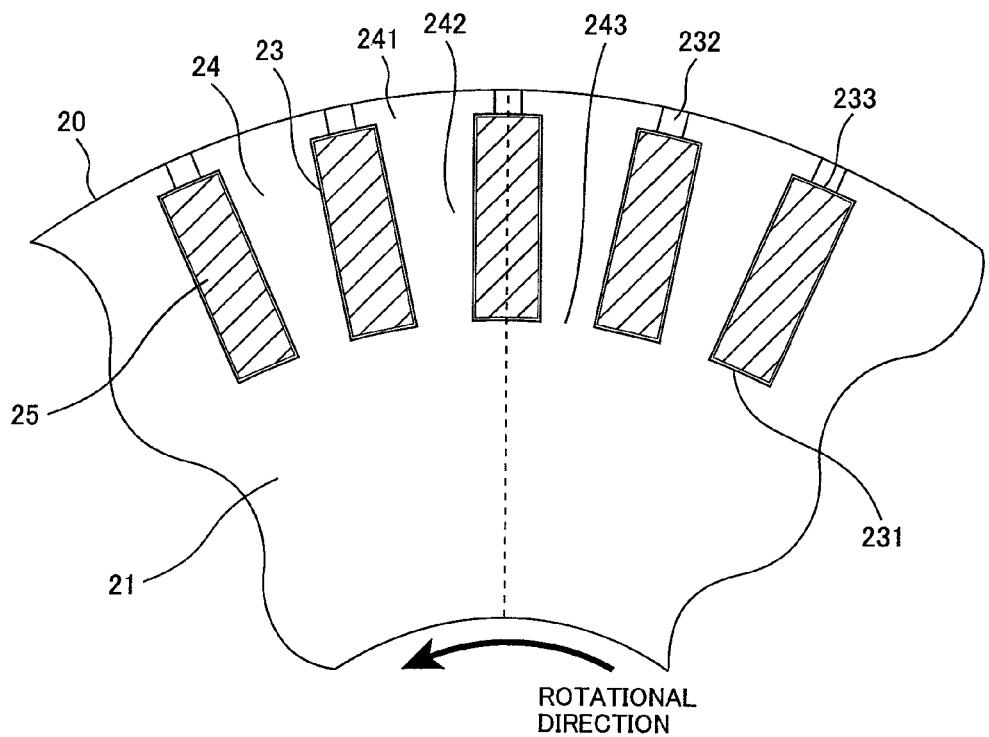
FIG. 10 is a partial cross sectional view of a rotor, illustrating the shapes of the rotor slots of a reference machine that was used for a comparison to confirm the advantageous effects of the rotating electric machine according to the present invention.

Next, the advantageous effects of the present invention will be described. To verify the advantageous effects of the present invention, an induction motor having the rotor 20 as shown in FIG. 10 is used as the reference machine and the rotating electric machines in the embodiments of the present invention are compared with the reference machine for various losses. With the rotor 20 of the reference machine, the rotor slots 23 are radially formed from the center of the rotation of the rotor 20 and the rotor slot opening 232 is formed at the center of the rotor slot 23 on its outer circumference. The rotor 20 of the reference machine makes it difficult for a magnetic flux to interlink the rotor bar 25. Furthermore, since more of the front part of the rotor tooth top 241 in the rotational direction is formed outside of the rotor bar 25 in the radial direction, the harmonic copper loss of rotor cage are likely to be generated.

Figure 11:
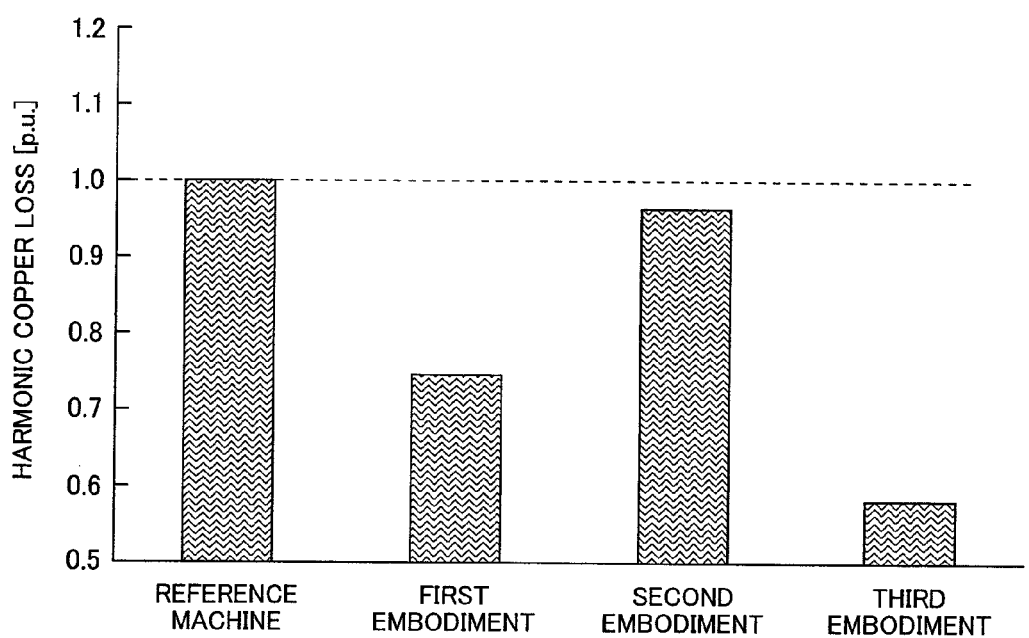
FIG. 11 is a graph comparing calculation results of harmonic copper loss of a rotor cage between the reference machine and the rotating electric machines according to the embodiments of the present invention.

FIG. 11 shows the computational results of the harmonic copper loss of rotor cage. Since the rotors in the first embodiment to the third embodiment are structured so that the rotor slot opening 232 is formed on the same side as the back of the rotor slot 23 in the rotational direction, the harmonic magnetic flux cannot easily penetrate the outside of the rotor bar 25 in the radial direction.

Accordingly, as is known from FIG. 11, the harmonic copper loss of rotor cage in these embodiments were reduced when compared with the reference machine. In particular, it can be confirmed that since the shape in the third embodiment is such that the front of the rotor tooth top 241 in the rotational direction does not come into contact with the outside of the rotor bar 25 in the radial direction, the harmonic copper loss of rotor cage were greatly reduced.

Figure 12:
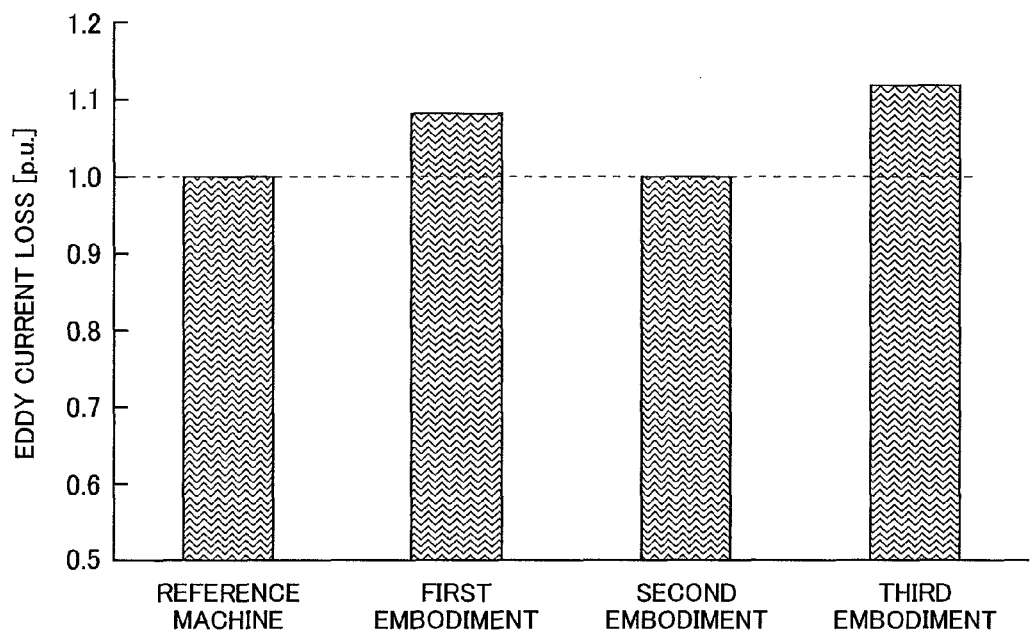
FIG. 12 is a graph comparing calculation results of a rotor eddy current loss between the reference machine and the rotating electric machines according to the embodiments of the present invention.

FIG. 12 shows the computational result of the eddy current loss in the rotor iron core 21. The reference machine in FIG. 12, with which the embodiments are compared, is an induction motor having the shape shown in FIG. 10.

Since the rotor slot openings 232 are formed in the rotor 20, the surface area of the rotor iron core 21 is reduced and the effective resistance on the surface of the rotor iron core 21 is increased, so the eddy current is increased as shown in FIG. 12.

However, the electric conductivity of the rotor bar 25 is several times larger than that of an electromagnetic steel plate used as the material of the rotor iron core 21, and a current is likely to flow in the rotor bar 25, so the harmonic copper loss of rotor cage are several times larger than the eddy current loss. Accordingly, when the rotor shapes in the first embodiment to the third embodiment are used, an amount by which the harmonic copper loss of rotor cage are reduced is larger than an amount by which the loss of the eddy current is increased, so the total of the loss due to the carrier frequency of the inverter and the losses according to the stator and the number of rotor slots can be reduced when compared with a general case in which the slot opening is formed at the center of the rotor slot 23. As a result, the efficiency of the induction motor 1 in a rated operation can be improved.

Figure 13:
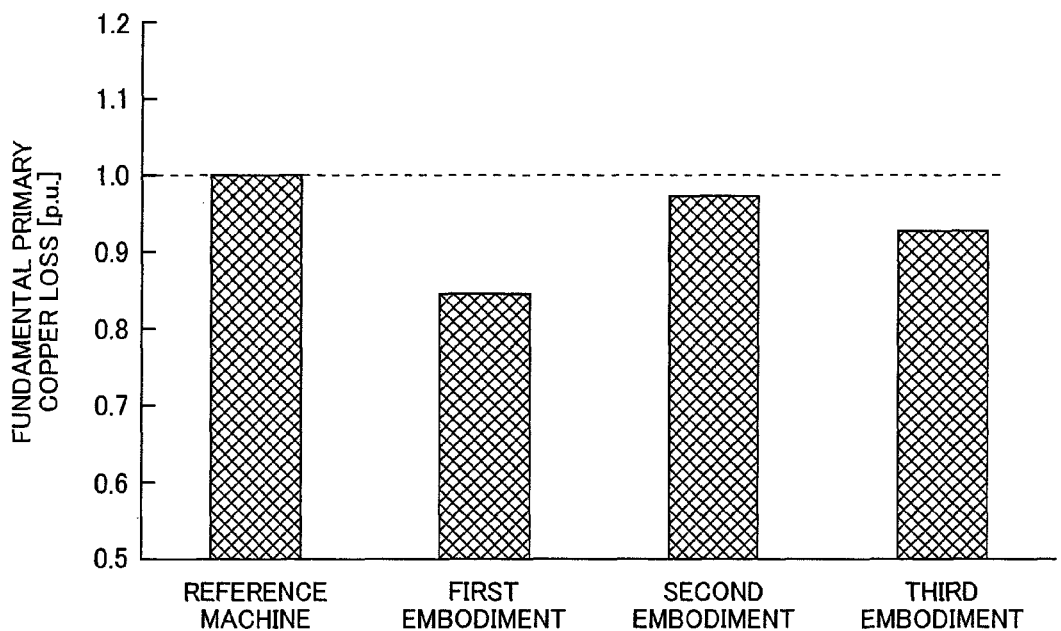
FIG. 13 is a graph comparing calculation results of the fundamental primary copper loss between the reference machine and the rotating electric machines according to the embodiments of the present invention.

FIG. 13 shows the computational result of the fundamental primary copper loss generated in the armature winding 13. The reference machine, in FIG. 13, with which the embodiments are compared, is an induction motor having the shape shown in FIG. 10.

When any of the rotor shapes in the first embodiment to the third embodiment are used, the rotor slot 23 is inclined with respect to the rotational direction and the magnetic flux can easily penetrate the rotor 20, enabling the magnetic flux to easily interlink the rotor bar 25. As a result, the power factor of the induction motor 1 is improved.

Since the rotor slot openings 232 are formed, the leakage flux can be reduced, enabling the power factor to be further improved. In addition, since the rotor slot opening 232 is formed at the back part of the rotor slot top 233 in the rotational direction of the rotor 20 so as to increase the cross sectional area of the rotor tooth top area on the advancing side in the rotational direction, the effect of magnetic saturation can be suppressed, so the power factor can be further improved.

Since the current flowing in the armature winding 13 can be reduced by improving the power factor, the fundamental primary copper loss can be reduced and the efficiency of the induction motor 1 in a rated operation can thereby be improved.

Fourth Embodiment

With a rotating electric machine having a large output exceeding several hundreds of kilowatts, the stator iron core 11 and rotor iron core 21 are divided into a plurality of parts in the axial direction of the rotational axis mainly for cooling. A stator ventilation duct 31 and a rotor ventilation duct 33 are provided between each of the iron cores. Stator duct pieces 32 are provided in the stator ventilation duct 31 at fixed angular intervals, and rotor duct pieces 34 are provided in the rotor ventilation duct 33 at fixed angular intervals. Usually, the duct pieces 32 and rotor duct pieces 34 are radially disposed from the center of the rotation of the rotor 20.

Figure 14:
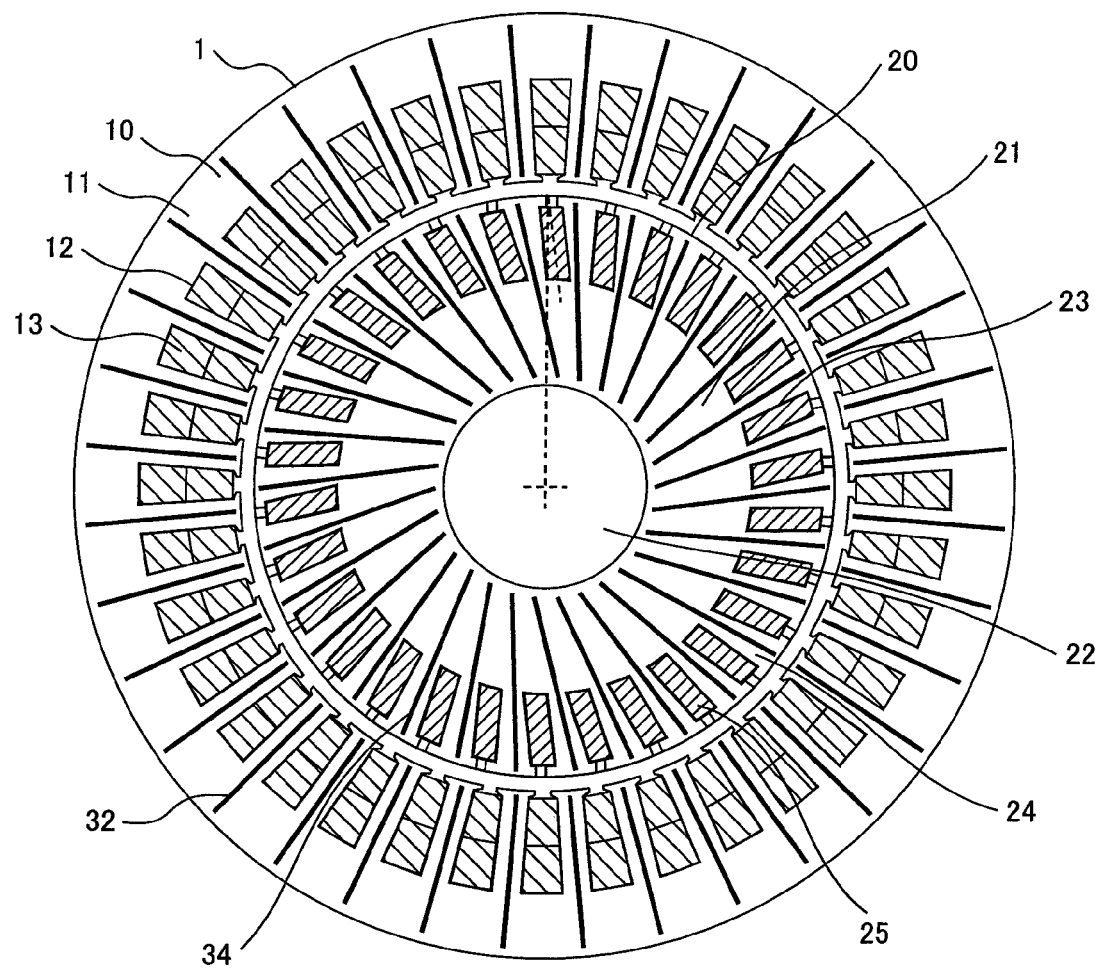
FIG. 14 is a lateral cross sectional view of the rotating electric machine according to the present invention when it is applied to a large machine (fourth embodiment).

With the induction motor in this embodiment, each rotor duct piece 34 is disposed so that it passes through the center of the relevant rotor tooth 24 as shown in FIG. 14. The rotor slot 23 may be formed in any of the shapes in the first embodiment to the third embodiment.

When the rotor duct pieces 34 are disposed as described above, they are inclined with respect to the rotational direction, enabling cooling air to easily flow in the induction motor 1. As a result, cooling performance is improved and the size of the induction motor 1 can be reduced while its output is maintained. When an external cooling fan or the like is provided outside the induction motor 1 to cool it, the output of the cooling fan can be reduced, enabling the efficiency of the induction motor 1 and its peripheral units to be improved and also enabling the size of the induction motor 1 to be reduced.

Fifth Embodiment

Figure 15:
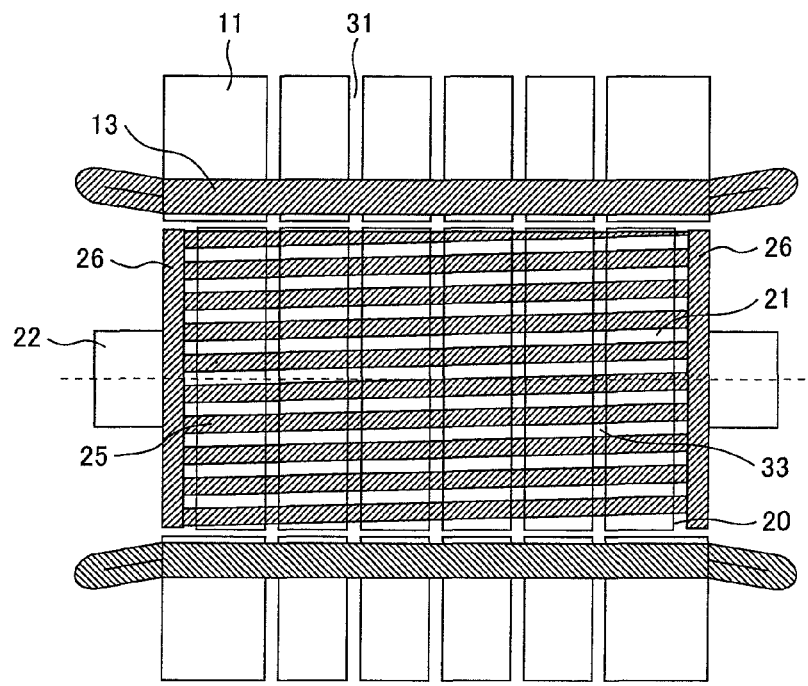
FIG. 15 is a lateral cross sectional view, illustrating an example of the shape of the rotor of the induction motor, which is the rotating electric machine according to the present invention (fifth embodiment).

An induction motor in a fifth embodiment is characterized in that, as shown in FIG. 15, the rotor bar 25 is skewed toward its axial direction.

The rotor bar 25 is shaped as in the first embodiment to the fourth embodiment. When a current flows in the rotor bar 25, a harmonic magnetic flux is generated from the rotor bar 25 in the gap between the stator 10 and the rotor 20 and another harmonic magnetic flux is generated therebetween according to the number of rotor slots. Since the rotor slot 23 is skewed, the harmonic magnetic flux generated from the rotor bar 25 and the harmonic magnetic flux generated according to the number of magnetomotive force rotor slots is mutually canceled in the axial direction of the induction motor 1 and reduced. Therefore, the skewness of the magnetic flux density generated in the gap between the stator 10 and the rotor 20 can be reduced, so noise and vibration can be suppressed and torque ripples in the induction motor can be reduced.

Sixth Embodiment

Figure 16:
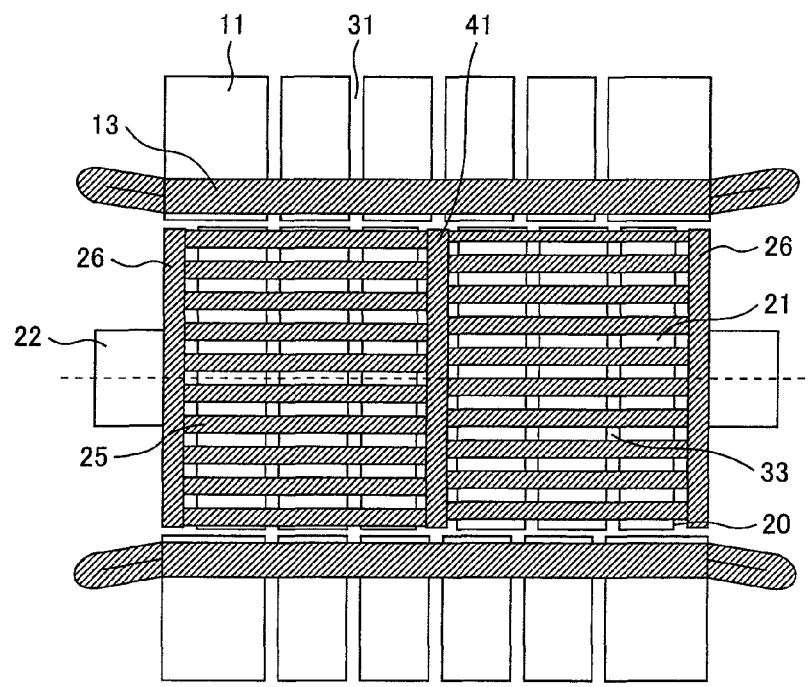
FIG. 16 is a lateral cross sectional view, illustrating another example of the shape of the rotor of the induction motor, which is the rotating electric machine according to the present invention (sixth embodiment).

An induction motor in a sixth embodiment is characterized in that, as shown in FIG. 16, an intermediate ring 41 is provided so that the rotor bars 25 are shorted at the center of the rotor 20 in its axial direction and that the rotor bars 25 on one side with respect to the intermediate ring 41 are displaced by a predetermined angle in the circumferential direction.

Since, in this embodiment, the rotor bars 25 on one side with respect to the intermediate ring 41 are displaced by the predetermined angle in the circumferential direction, the harmonic magnetic fluxes generated from the rotor bars 25 and the harmonic magnetic fluxes generated according to the number of magnetomotive force rotor slots each have different phases on different sides with respect to the intermediate ring 41, so the harmonic magnetic fluxes on both sides are mutually canceled and reduced.

That is, the advantage of the skew explained in the fifth embodiment can be obtained, so noise and vibration can be suppressed and torque ripples can be reduced. When the rotor bar 25 is skewed, a lateral flow loss may be generated because an electric potential is generated in the axial direction between adjacent rotor bars 25 and a short-circuit current flows through the rotor iron core 21. In this embodiment, however, a difference in the electric potential between adjacent rotor bars 25 is constant, so no lateral flow loss is generated, enabling the efficiency of the induction motor 1 to be improved.

Seventh Embodiment

Figure 17:
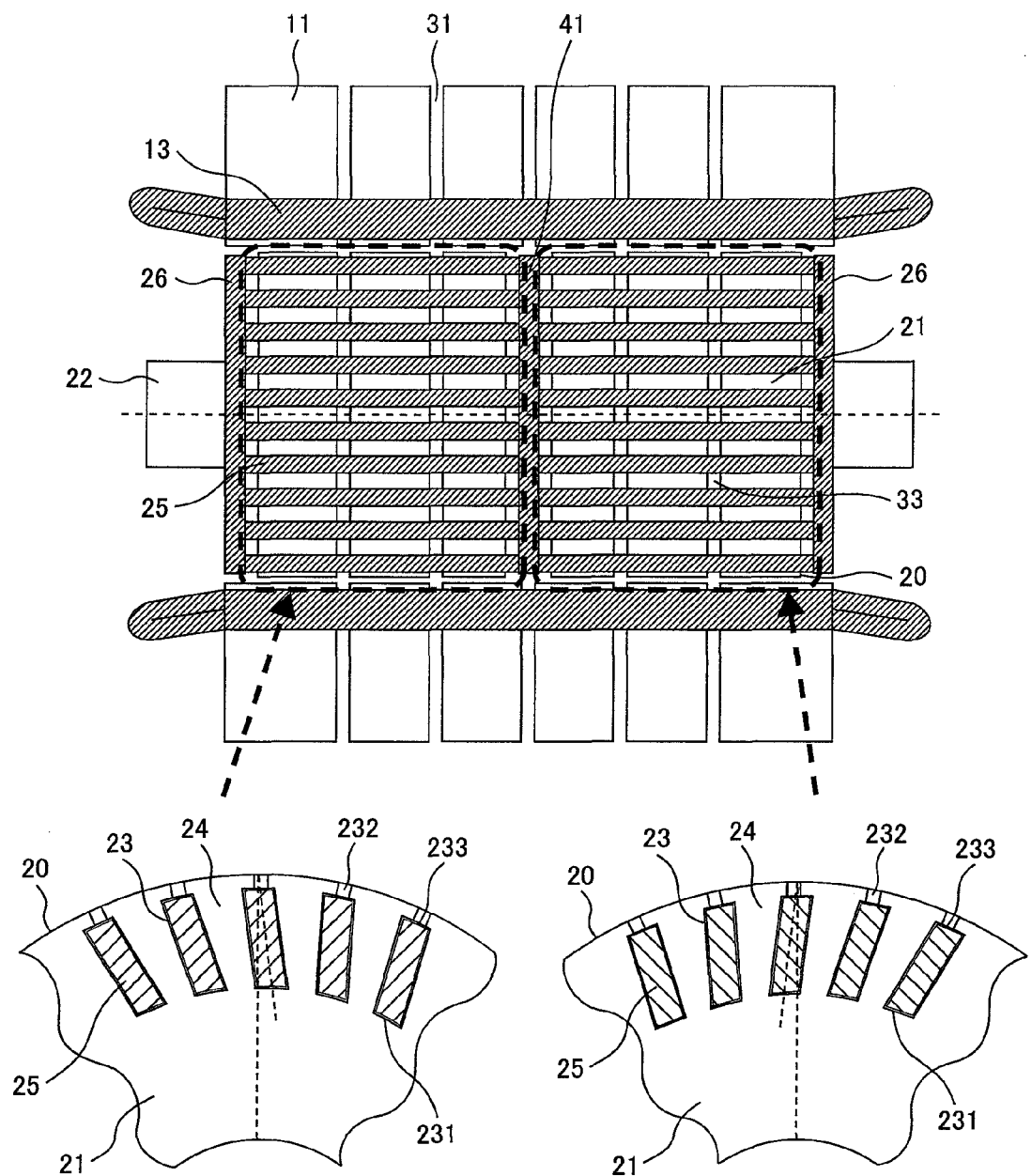
FIG. 17 is a lateral cross sectional view, illustrating yet another example of the shape of the rotor of the induction motor, which is the rotating electric machine according to the present invention (seventh embodiment).

An induction motor in a seventh embodiment is characterized in that, in the rotor 20 having the intermediate ring 41 as shown in FIG. 17, when the rotor slots of the rotors on both sides on the drawing with respect to the intermediate ring 41 are mutually overlapped in the axial direction, the directions of the inclinations of the rotor slots 23 are symmetric with respect to a straight line drawn from the center of the rotation in the radial direction. In other words, the inclination of the rotor slots of the rotor on the right side with respect to the intermediate ring 41 on the drawing is opposite to the inclination of the rotor slots of the rotor on the left side. The rotor slot 23 may be formed in any of the shapes in the first embodiment to the third embodiment.

By making an induction motor have a shape of the rotor described in this embodiment, even if the rotor 20 is rotated in the reverse direction, the magnetic flux is likely to interlink the rotor bar 25, so the fundamental primary copper loss can be reduced and the efficiency in a rated operation can be improved.

Although the above embodiments have been applied to induction motors as examples, these embodiments can also be applied similarly to induction generators by reversing the rotational direction.

What is claimed is:

1. A rotating electric machine, comprising:
a stator that includes a stator iron core having a plurality of stator slots, which are formed on the inner diameter side of the stator iron core, are spaced in a circumferential direction at predetermined intervals, and extend in an axial direction, and an armature winding provided in the stator slots; and
a rotor disposed opposite to the stator with a predetermined gap therebetween, the rotor including a rotor iron core having a plurality of rotor slots, which are formed on the outer diameter side of the rotor iron core, are spaced in the circumferential direction at predetermined intervals, and extend in the axial direction, rotor bars, each of which is provided in one rotor slot, and end rings connected to the ends of the rotor bars;
wherein each rotor slot is asymmetrically shaped in the circumferential direction with respect to a straight line drawn from a central axis of rotation of the rotor in a radial direction;
wherein a slot opening is provided at the top of each rotor slot, the width of the slot opening being smaller in the circumferential direction than the width of the rotor slot; and
wherein an outer corner of the rotor slot is machined, the outer corner being located behind in the rotational direction.

2. The rotating electric machine according to claim 1, wherein the bottom of the rotor slot is located behind in a rotational direction with respect to an outer edge of the rotor.

3. The rotating electric machine according to claim 1, wherein the rotor slots have different widths at the bottom and at the top.

4. The rotating electric machine according to claim 1, wherein a width of the rotor tooth is substantially fixed except at the top.

5. The rotating electric machine according to claim 1, wherein a duct piece is provided between each of the rotor slots of the rotor iron core, the duct piece being placed parallel to a central axis of the rotor slot.

6. The rotating electric machine according to claim 1, wherein the rotor slot is skewed between both its ends in the axial direction.

7. The rotating electric machine according to claim 1, wherein an intermediate ring is formed at the center in an axial direction of the rotor to short the rotor bars, rotor slots on one side with respect to the intermediate ring being displaced in the circumferential direction.

8. The rotating electric machine according to claim 1, wherein an intermediate ring is formed at the center in an axial direction of the rotor to short the rotor bars, rotor slots of the rotor on one side with respect to the intermediate ring and rotor slots on another side being inclined in opposite directions.

9. A rotating electric machine, comprising:
a stator that includes a stator iron core having a plurality of stator slots, which are formed on the inner diameter side of the stator iron core, are spaced in a circumferential direction at predetermined intervals, and extend in an axial direction, and an armature winding provided in the stator slots; and
a rotor disposed opposite to the stator with a predetermined gap therebetween, the rotor including a rotor iron core having a plurality of rotor slots, which are formed on the outer diameter side of the rotor iron core, are spaced in the circumferential direction at predetermined intervals, and extend in the axial direction, rotor bars, each of which is provided in one rotor slot, and end rings connected to the ends of the rotor bars;
wherein each rotor slot is asymmetrically shaped in the circumferential direction with respect to a straight line drawn from a central axis of rotation of the rotor in a radial direction;
wherein the bottom of the rotor slot is located behind in a rotational direction and a slot opening is provided at the top of each rotor slot, the slot opening being located behind in the rotational direction; and
wherein an outer corner of the rotor slot is machined, the outer corner being located behind in the rotational direction.

10. The rotating electric machine according to claim 9, wherein the rotor slots have different widths at the bottom and at the top.

11. The rotating electric machine according to claim 9, wherein a width of the rotor tooth is substantially fixed except at the top.

12. The rotating electric machine according to claim 9, wherein a duct piece is provided between each of the rotor slots of the rotor iron core, the duct piece being placed parallel to a central axis of the rotor slot.

13. The rotating electric machine according to claim 9, wherein the rotor slot is skewed between both its ends in the axial direction.

14. The rotating electric machine according to claim 9, wherein an intermediate ring is formed at the center in an axial direction of the rotor to short the rotor bars, rotor slots on one side with respect to the intermediate ring being displaced in the circumferential direction.

15. The rotating electric machine according to claim 9, wherein an intermediate ring is formed at the center in an axial direction of the rotor to short the rotor bars, rotor slots of the rotor on one side with respect to the intermediate ring and rotor slots on another side being inclined in opposite directions.

* * * * *